United States Patent [19]

Warnaka

[11] Patent Number: 4,477,505

[45] Date of Patent: Oct. 16, 1984

[54] STRUCTURE FOR ABSORBING ACOUSTIC AND OTHER WAVE ENERGY

[75] Inventor: Glenn E. Warnaka, Erie, Pa.

[73] Assignee: Lord Corporation, Erie, Pa.

[21] Appl. No.: 449,479

[22] Filed: Dec. 13, 1982

[51] Int. Cl.[3] .......................... B32B 3/12; B32B 5/18

[52] U.S. Cl. .................................. 428/160; 181/284; 181/290; 181/294; 428/158; 428/166; 428/172; 428/308.4

[58] Field of Search ............... 428/166, 158, 178, 179, 428/182, 186, 308.4, 160, 172; 181/284, 285, 290, 293, 294

[56] References Cited

U.S. PATENT DOCUMENTS 2,356,640 8/1944 Wolff ................................ 181/290

3,176,789 4/1965 Lighter .............................. 181/290

FOREIGN PATENT DOCUMENTS 650313 1/1929 France ................................ 181/293

827042 2/1960 United Kingdom ................ 181/293

*Primary Examiner*—Paul J. Thibodeau

*Attorney, Agent, or Firm*—Thomas H. Murray; Clifford A. Poff

[57] ABSTRACT

A structure for absorbing wave energy, particularly acoustic wave energy, which includes a first essentially planar surface against which wave energy is directed and a second essentially planar surface generally parallel to and spaced from the first surface. Wedge-shaped elements of sound-absorbing material are disposed between the planar surfaces. All of the wedge-shaped elements, which may be of triangular cross section or pyramidal, have generally flat base portions which form said first planar surface against which wave energy is directed. The apex portions of the wedge-shaped elements are in substantial abutment with the second planar surface. The invention has utility in anechoic applications; however, in contrast to prior art structures of this type, the apex portions of the sound-absorbing material face away from incident wave energy rather than facing toward it.

9 Claims, 12 Drawing Figures

STRUCTURE FOR ABSORBING ACOUSTIC AND OTHER WAVE ENERGY

BACKGROUND OF THE INVENTION

In the past, various anechoic test chamber constructions have been proposed for producing an essentially echo-free environment. Anechoic members, which are generally formed of solid, wedge-shaped blocks of sound-absorbing material, have long been used in such chambers. As conventionally employed, the larger base portions of the members are mounted adjacent the chamber wall, ceiling and/or floor surfaces; while their relatively small apex portions face the source of sound to be absorbed. In this conventional orientation of the members, they may be and usually are of considerable size. The length of the members, which is normally within the range of one-to-four feet, is approximately a linear function of the lower limiting frequency (i.e., the "cut-off" frequency) desired in each particular installation. In order to achieve a 1-octave reduction of the cut-off frequency with the use of conventionally-oriented anechoic members, their lengths must be approximately doubled. In addition to being expensive from the materials and fabrication viewpoints, large anechoic members of this type occupy much of the interior space of the anechoic chamber in which they are installed. The chamber design customarily requires a choice between the expense of constructing and maintaining a chamber of sufficiently large size to accommodate longer wedge-shaped members, versus the acceptance of a smaller chamber and a less satisfactory cut-off frequency. Additionally, conventionally-oriented anechoic members are difficult and expensive to maintain. When facing the source of wave energy to be absorbed, their more fragile apex portions are susceptible to damage from accidental impacts from persons or equipment within the chamber; and the crevices defined by an array of them tend to collect dust and the like which cannot be removed readily.

SUMMARY OF THE INVENTION

The present invention resides in the discovery that superior sound-absorption at lower frequencies can be achieved when the anechoic members are "reverse-oriented" (i.e., when their relatively large base portions are disposed such that they face the source of wave energy to be attenuated, while their relatively small apex portions face the wall, ceiling and/or floor surfaces of the anechoic chamber). When an array of reverse-oriented anechoic members is employed in this manner, a desired cut-off frequency may be achieved with the use of smaller wedge-shaped members, thus saving chamber space and material cost. Furthermore, a lower cut-off frequency may be achieved with members of the same size. Additionally, maintenance problems are reduced or eliminated since the apex portions of the sound-absorbing members are not exposed to accidental impacts and the like; and the contiguous base portions of the members collectively may define a substantially or completely continuous planar surface that is not as likely to collect dust and the like and is more readily cleanable than prior art assemblies.

In contrast with the appearance of an array of conventionally-oriented anechoic members, which is quite disconcerting, reverse-oriented anechoic members make an array of such members more acceptable for general purpose use and produce a much more pleasing appearance to members of the general public viewing the same in buildings such as residences, restaurants, auditoriums and the like. Furthermore, the planar appearance of an array of reverse-oriented anechoic members can be made more acceptable by painting, wallpapering, etc., so long as the surface so decorated remains sufficiently permeable to acoustic waves. In this respect, it should be understood that the invention has applicability not only to anechoic chambers as such, but also to any architectural or other application where wave energy absorption is required, including microwave absorption.

The sound-absorbing structure of the invention, therefore, provides the following advantages: (1) It provides better sound absorption at low frequencies or, conversely, the same sound-absorption with smaller-sized members. (2) It is easier to keep clean than conventional anechoic assemblies. (3) It is less susceptible to damage. (4) It produces a more aesthetically acceptable appearance when viewed by members of the general public. (5) Finally, it is readily adaptable for use in general purpose rooms, and for other applications as well as in anechoic chambers.

The above and other objects and features of the invention will become apparent from the following detailed description taken in connection with the accompanying drawings which form a part of this specification, and in which.

Figure 5:
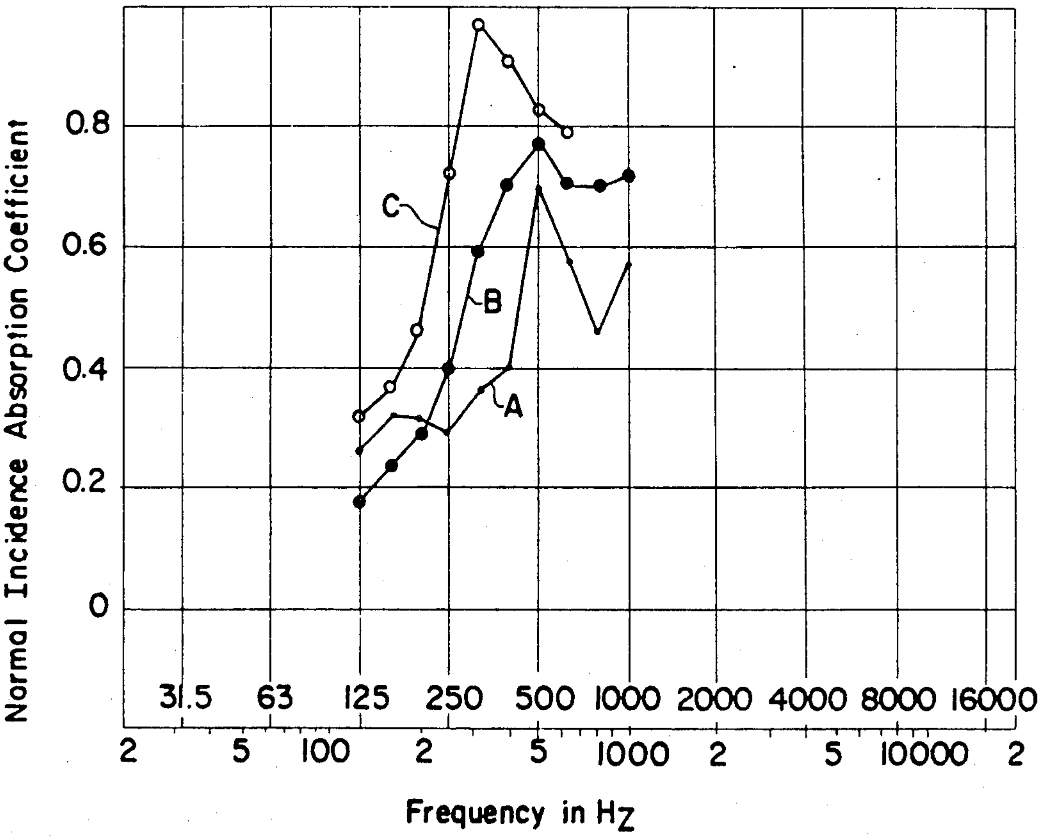
Figure 5A:
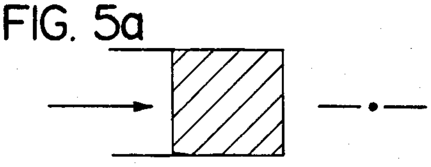
Figure 5C:
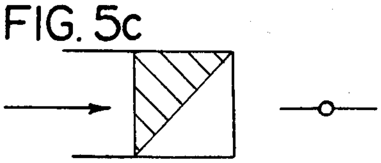
Figure 5B:
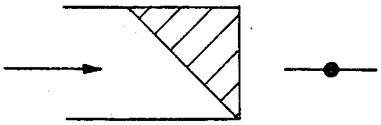
Figure 6:
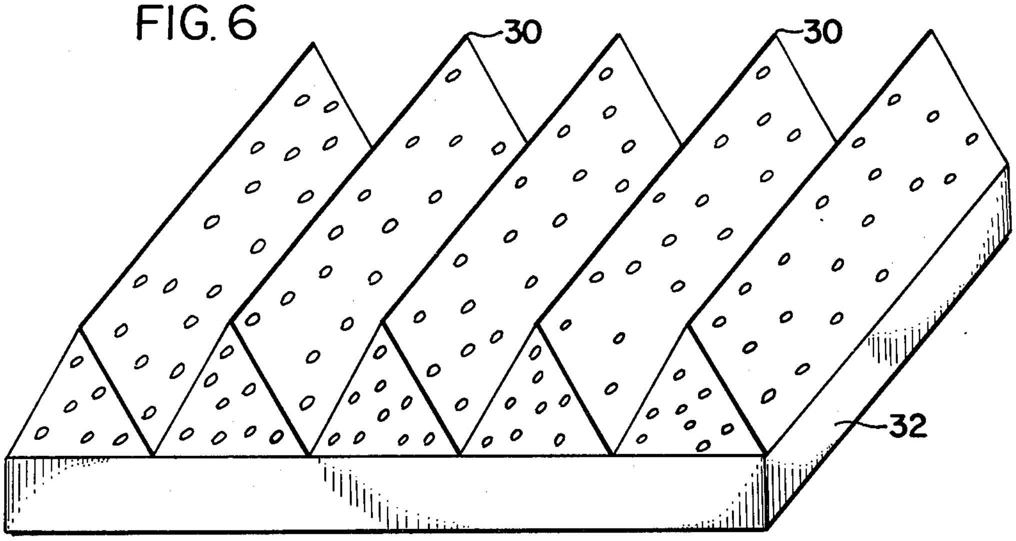
Figure 7:
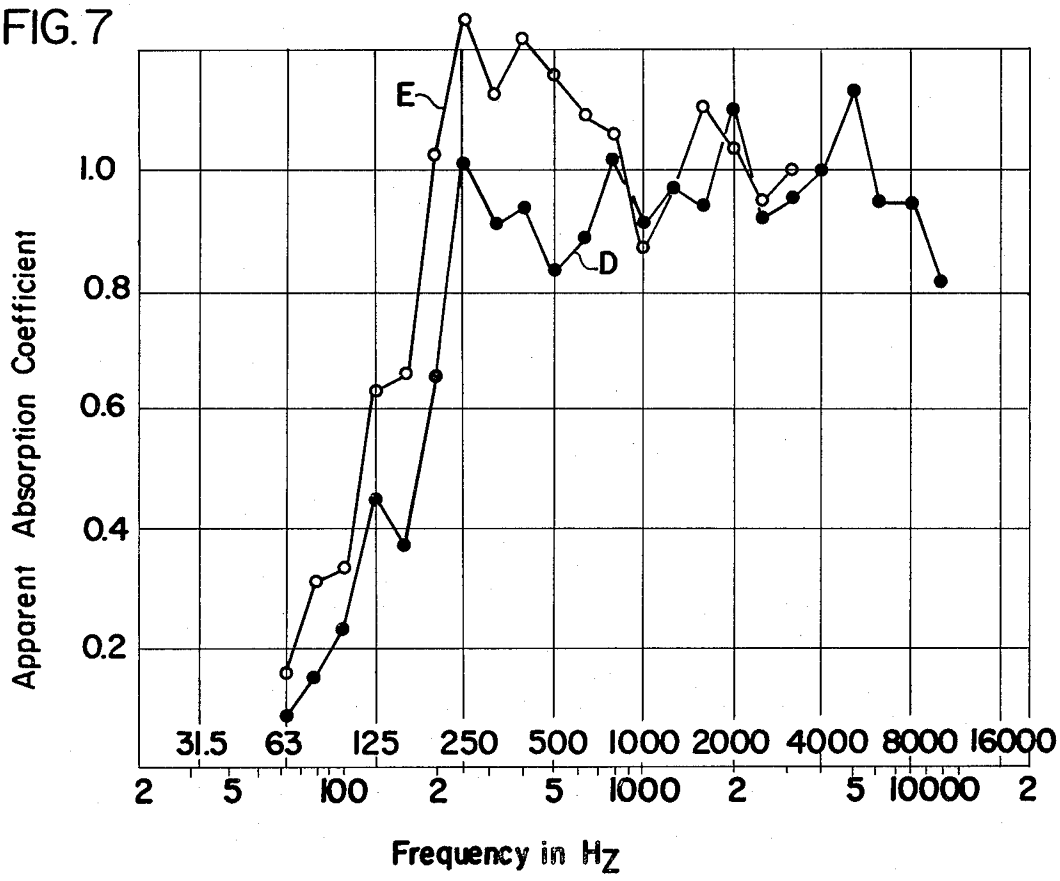
Figure 8:
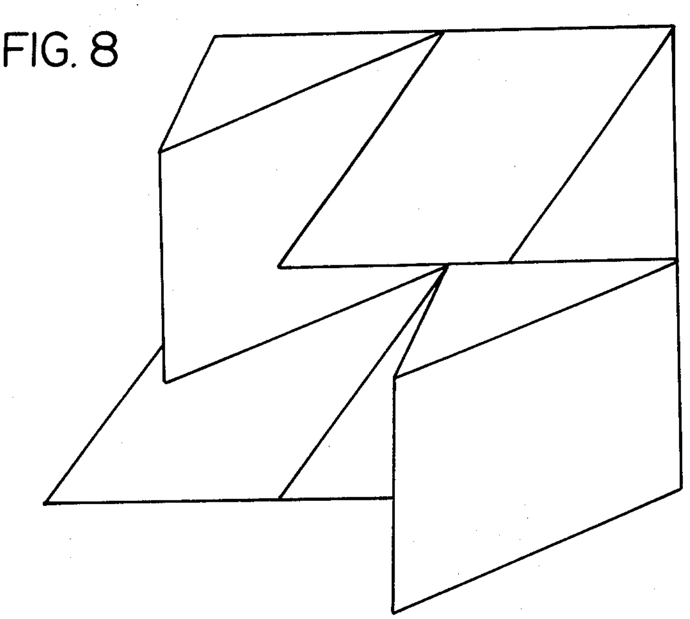
Figure 9:
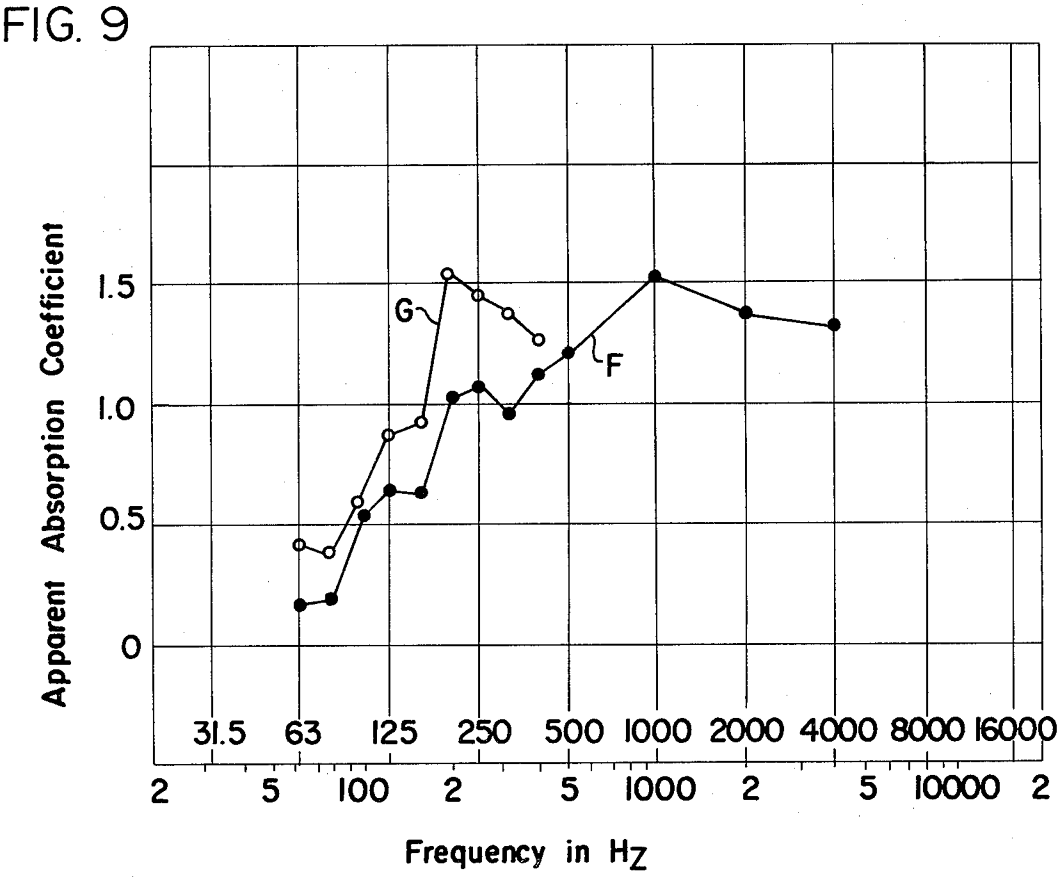

FIG. 5, taken in conjunction with FIGS. 5A–5C, is a plot of normal incidence absorption coefficient versus frequency for two prior art configurations (FIGS. 5A and 5B) as contrasted with the present invention (FIG. 5C):

FIG. 6 is a perspective view of a typical sound-absorbing panel utilizing the principles of the invention;

FIG. 7 is a plot of apparent absorption coefficient versus frequency, showing the comparison between the present invention and conventional prior art wedge-shaped anechoic members measured in a 300-cubic meter reverberation room;

FIG. 8 is a perspective view of another arrangement of the sound-absorbing members of the invention; and FIG. 9 is a plot of apparent absorption coefficient versus frequency of 30-centimeter wedges measured in a 348-cubic meter reverberation room.

Figure 1:
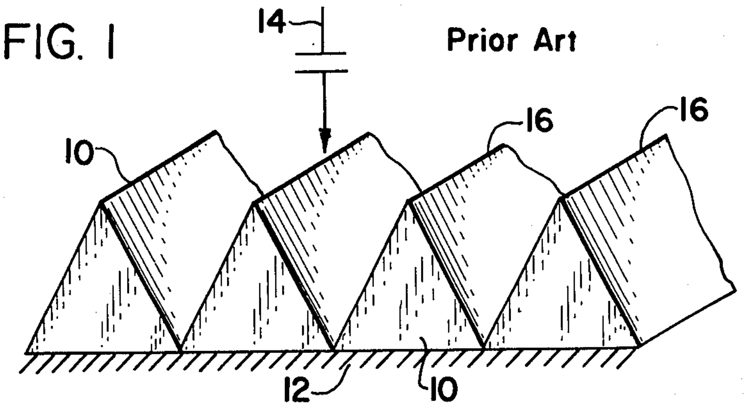
FIG. 1 Prior Art
FIG. 1 is an illustration of a conventional prior art anechoic sound-absorbing configuration utilizing wedge-shaped members.

With reference now to the drawings and particularly to FIG. 1, a conventional prior art anechoic sound-absorbing configuration is shown. It comprises a plurality of wedge-shaped members 10 of generally triangular cross-sectional configuration mounted on a support surface 12 which may, for example, be a wall, celing or floor of an anechoic chamber. Incident sound wave energy is indicated by the arrow 14. It will be noted that the wave energy is directed against the apexes 16 of the respective wedge-shaped members 10.

When the configuration of FIG. 1 is used in an anechoic testing room, no significant amount of energy from the source should be reflected from the walls of the room. In order to achieve the required performance, materials with a high coefficient of acoustic absorption are used to cover the walls of the testing room. To improve the performance further, the sound-absorbing material is conventionally formed into the wedge-shaped members 10 shown in FIG. 1. However, instead of elongated wedge-shaped members, the sound-absorbing material may be formed into pyramids or other pointed structures whose bases abut each other. In this respect, when the term "wedge-shaped element" is used in the specification and claims, it is intended to cover both an elongated wedge-shaped configuration, a pyramidal configuration, or another similar configuration in which there is a substantially flat base portion and an apex portion spaced therefrom. As shown in FIG. 1, the apexes or "points" of the wedges 10 face into a room such that the wave energy, diagrammatically indicated by the arrow 14, impinges on the apexes 16.

Figure 2:
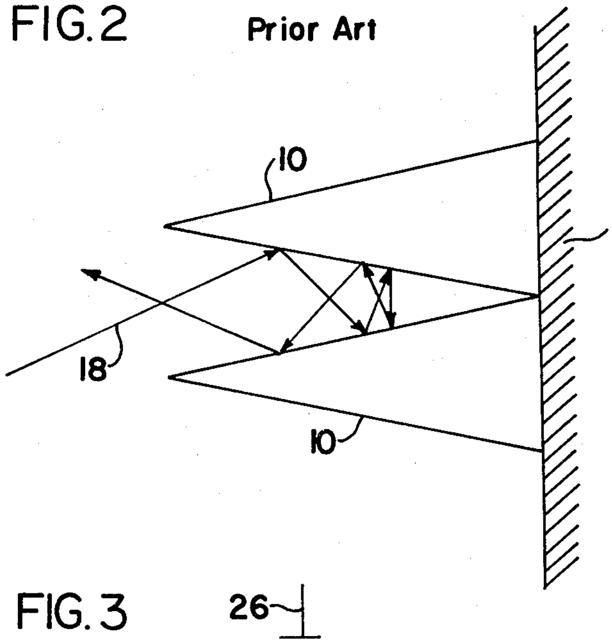
FIG. 2 Prior Art
FIG. 2 illustrates the manner in which sound is absorbed in the conventional prior art configuration of FIG. 1.

Reflection of a sound wave from the conventional anechoic wedges of FIG. 1 is shown in FIG. 2. Here a sound wave 18, striking at an oblique angle, is reflected from the surface of adjacent wedges 10 a number of times before emerging from the configuration. Multiple reflections extract energy by absorption each time the sound wave strikes the material and its effect is thus multiplied.

Figure 3:
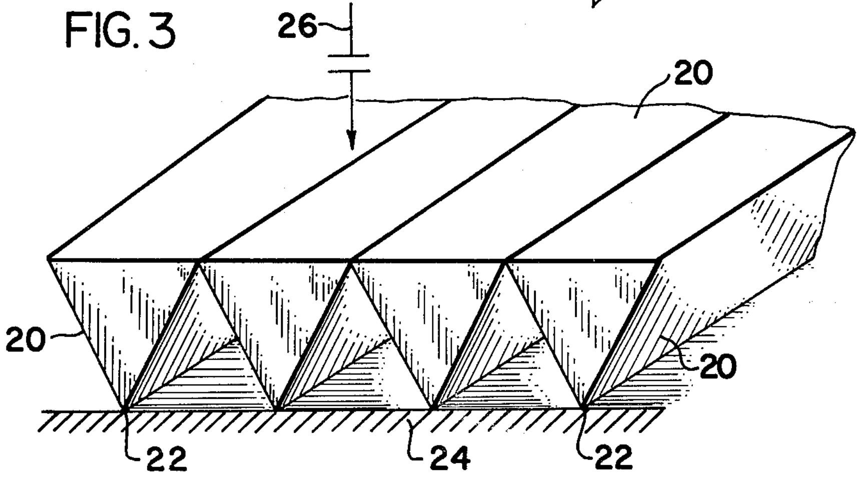
FIG. 3 is an illustration of the anechoic configuration of the present invention.
Figure 4:
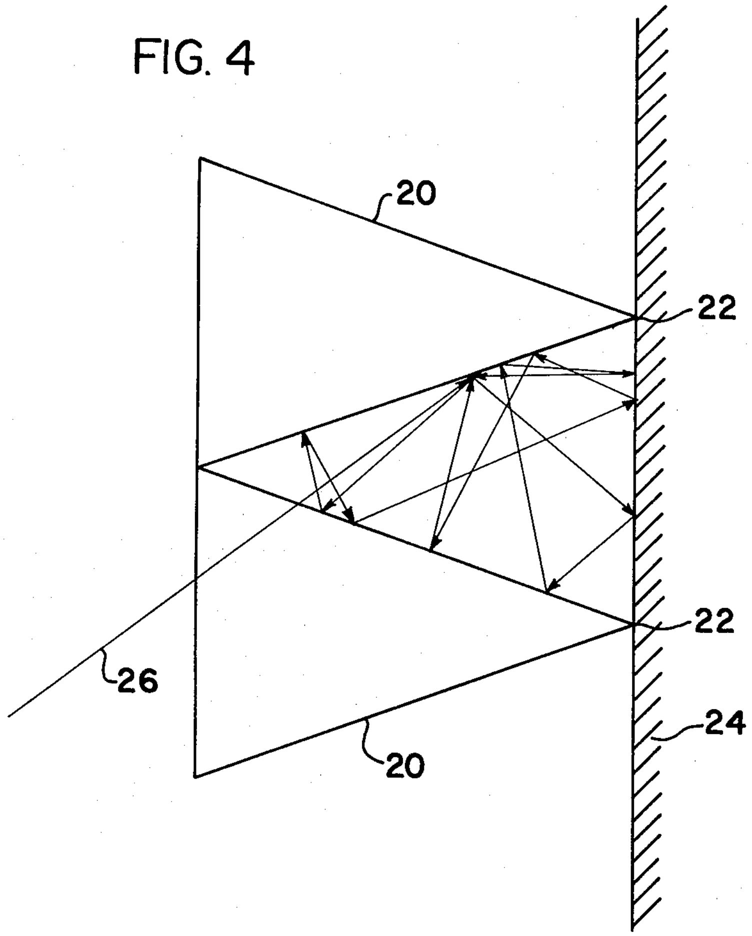
FIG. 4 shows the manner in which sound is absorbed with the anechoic configuration of the invention.

The configuration of the present invention is shown in FIG. 3; and while it again employs wedge-shaped sound-absorbing members 20, the configuration is such that the apexes 22 of the wedge-shaped members abut, or at least substantially abut, a wall support member 24 while incident wave energy, represented by the arrow 26, impinges on the flat base portions of the wedge-shaped members. In FIG. 4, treatment of a sound wave absorbed by the wedge configuration of FIG. 3 is shown. Here the triangular cavity within the inverted wedges 20 trap sound waves 28 that enter them. In this case, a wave that once enters the cavity is endlessly reflected until it is totally absorbed. At the very least, wave energy trapped in the cavity cannot escape without penetrating the material itself. It should be understood that the wave interactions at a surface are clearly more complicated than illustrated in FIG. 4; however FIG. 4 does illustrate the general manner in which the wave energy is absorbed in accordance with the invention.

To illustrate the effectiveness of the invention, samples were cut from the same large piece of low-density polyurethane foam. Three samples tested are shown in FIGS. 5A, 5B and 5C. One sample (FIG. 5A) consisted of a solid block of polyurethane foam. In another sample (FIG. 5B), a wedge-shaped block was positioned such that the base of the wedge was against the sample holder back, representing a conventional anechoic wedge. A second wedge-shaped sample (FIG. 5C), representing the present invention, was positioned such that the base of the wedge faced the sound source. The depth of each sample was 10 centimeters. Acoustic absorption tests were performed in a Bruel and Kjaer impedance tube; and the data are shown in FIG. 5 wherein curves A, B and C represent the results achieved with the samples of FIGS. 5A, 5B and 5C, respectively. The conventional anechoic wedge arrangement (curve B) is shown to be somewhat better than the solid block of material (curve A). However, the inverted wedge configuration (curve C) is shown to be quite superior to both the solid block (curve A) and the conventional anechoic wedge (curve B).

In order to further illustrate the desirable effects of the invention, a series of tests were performed in a reverberation room. The test sample for these tests is shown in FIG. 6. It comprises elongated polyurethane foam wedges 30 mounted on a cardboard frame 32. Typical reverberation room tests for acoustic absorption were performed with the sample of FIG. 6. In one case, the sample was installed on the floor of the reverbration room with the flat base (i.e., the cardboard frame 32) against the floor of the room, so that the points of the wedges pointed upwardly to simulate a conventional anechoic configuration. In another case, the sample was simply turned upside-down on the floor such that the points of the wedges supported the sample. The results of these tests, performed in a 300-cubic meter reverberation room, are shown in FIG. 7 wherein curve D represents the results obtained when the apexes are pointed upwardly from the floor while curve E represents the result achieved when the configuration was reversed and each apex is rested on the floor. Note that the configuration of the present invention (curve E) gives superior performance over a conventional anechoic configuration (waveform D) particularly at the lower frequencies in the range of about 63–750 hertz.

As a further test, 11.1 square meters of 30-centimeter polyurethane wedges were prepared for testing. For this test, the sample was made up of a large number of independent wedges, each wedge having a square cross section, and the wedges being installed such that the apexes of adjacent wedges were normal to each other (FIG. 8). Reverberation tests were run independently in a 348-cubic meter room. The results of the test are shown in FIG. 9 wherein curve F represents the results achieved when the apexes of the wedges pointed toward the source of wave energy; whereas curve G represents the results achieved when the reverse configuration was employed. Note that improved performance was again achieved, particularly at the lower frequency range of about 63–500 hertz. It is apparent, therefore, that not only is absorption enhanced but so also is low frequency response.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A structure for absorbing wave energy comprising the combination of a wall, ceiling or floor support member, and a plurality of wedge-shaped elements of sound-absorbing material, each of said elements having an essentially flat base portion for initial absorption of wave energy and an oppositely-disposed apex portion affixed to said support member for absorbing residual wave energy passing from said flat base portion, the elements being arranged in side-by-side relationship with their base portions in abutting edge-to-edge relationship outwardly of said support member to form an essentially contiguous planar surface for initial impingement and absorption of wave energy with the apex portion of each element extending away from said planar surface on one side thereof to said support member for trapping residual wave energy which permeates beyond said contiguous planar surface.

2. The structure of claim 1 wherein said wall support member comprises the boundary of a room.

3. The structure of claim 1 wherein said wave energy comprises acoustic wave energy.

4. The structure of claim 1 wherein the wedge-shaped elements comprise pyramids.

5. The structure of claim 1 wherein the wedge-shaped elements are formed from foam material.

6. The structure of claim 1 wherein said foam material comprises polyurethane foam.

7. The structure of claim 1 wherein said wedge-shaped elements comprise elongated blocks of essentially triangular cross section.

8. A structure for absorbing wave energy comprising a wall, ceiling or floor support means, a first essentially planar surface against which wave energy is directed for initial absorption of wave energy, a second essentially planar surface generally parallel to and spaced from the first surface and affixed to said support means, and a plurality of wedge-shaped elements of sound-absorbing material disposed between the planar surfaces for absorbing residual wave energy passing from said planar surface, all of said wedge-shaped elements having generally flat base portions forming said first planar surface against which wave energy is directed and apex portions in substantial abutment with said second planar surface for trapping residual wave energy which permeates beyond said planar surface.

9. The structure of claim 8 wherein the spaces between said wedge-shaped elements form chambers within which incident wave energy reverberates against the walls of the wedge-shaped elements.

* * * * *